(12) United States Patent
Ramond et al.

(10) Patent No.: US 8,412,478 B2
(45) Date of Patent: Apr. 2, 2013

(54) DEVICE FOR DETERMINING AN ERROR INDUCED BY A HIGH-PASS FILTER AND ASSOCIATED ERROR CORRECTION METHOD

(75) Inventors: Alain Ramond, Merville (FR);
Simon-Didier Venzal, Toulouse (FR);
Michel Suquet, Villeneuve-Tolosane (FR)

(73) Assignee: Continental Automotive France, Toulouse (FR)

( * ) Notice: Subject to any disclaimer, the term of this patent is extended or adjusted under 35 U.S.C. 154(b) by 932 days.

(21) Appl. No.: 12/446,360

(22) PCT Filed: Oct. 12, 2007

(86) PCT No.: PCT/EP2007/008868
§ 371 (c)(1),
(2), (4) Date: Jul. 13, 2009

(87) PCT Pub. No.: WO2008/046560
PCT Pub. Date: Apr. 24, 2008

(65) Prior Publication Data
US 2011/0314328 A1    Dec. 22, 2011

(30) Foreign Application Priority Data
Oct. 18, 2006  (FR) ..................... 06 09126

(51) Int. Cl.
*G01D 3/036* (2006.01)
*G06F 19/00* (2011.01)

(52) U.S. Cl. ........... 702/85; 73/1.01; 73/1.88; 73/865.8; 327/336; 702/104; 702/107; 702/190; 702/191; 708/300

(58) Field of Classification Search ............ 73/1.01, 73/1.88, 865.8; 327/334, 336; 702/85, 86, 702/87, 88, 90, 104, 106, 107, 127, 189, 702/190, 191, 194, 195; 708/100, 105, 200, 708/300
See application file for complete search history.

(56) References Cited

U.S. PATENT DOCUMENTS

| 3,510,696 A | * | 5/1970 | Zollinger et al. ............. 327/509 |
| 3,511,979 A | * | 5/1970 | Carnevale, Jr. et al. ....... 708/830 |
| 3,515,343 A | * | 6/1970 | Schwartzenberg et al. ... 702/107 |
| 3,535,547 A | * | 10/1970 | Lutz ............................. 327/336 |

(Continued)

FOREIGN PATENT DOCUMENTS

| DE | 40 00 131 | 4/1991 |
| EP | 1 162 837 | 2/2002 |

(Continued)

OTHER PUBLICATIONS

International Search Report dated Mar. 27, 2008, from corresponding PCT application.

*Primary Examiner* — Edward Cosimano
(74) *Attorney, Agent, or Firm* — Young & Thompson

(57) ABSTRACT

Device for determining an error induced by a high-pass filter in a signal, including a unit (3) for calculating the error according to the formula:

$$E(t)=V_e(t)-V_s(t)=2\cdot\Pi\cdot F_c\cdot\int_{\alpha=t_0}^{t}(V_s(\alpha)-\overline{V}_s(\alpha))\cdot d\alpha+E(t_0)$$

with: $E(t)$ the value of the error induced by the high-pass filter, as a function of the time variable t, $\Pi$ the trigonometric constant, $F_c$ the cutoff frequency of the high-pass filter, $t_0$ the initial instant, $\alpha$ integration variable, $V_e$ the signal input to the high-pass filter, $V_s$ the signal output by the high-pass filter, $\overline{V}_s$ the mean value of the signal $V_s$. A method of correcting the error induced is also presented and applicable to the error correction of a piezoelectric pressure sensor.

15 Claims, 3 Drawing Sheets

U.S. PATENT DOCUMENTS

| | | | |
|---|---|---|---|
| 3,633,043 A * | 1/1972 | Anthony | 327/129 |
| 5,097,235 A | 3/1992 | Reichel | |
| 8,297,114 B2 * | 10/2012 | Ramond et al. | 73/114.16 |
| 2002/0064239 A1 | 5/2002 | Husth | |
| 2004/0264601 A1 | 12/2004 | Demier et al. | |
| 2011/0030462 A1 * | 2/2011 | Ramond et al. | 73/114.16 |

FOREIGN PATENT DOCUMENTS

| | | | |
|---|---|---|---|
| FR | 2907543 A1 * | 4/2008 | |
| WO | WO 2008/046560 A1 * | 4/2008 | |

* cited by examiner

DEVICE FOR DETERMINING AN ERROR INDUCED BY A HIGH-PASS FILTER AND ASSOCIATED ERROR CORRECTION METHOD

BACKGROUND OF THE INVENTION

1. Field of the Invention

The present invention relates to the determination and correction of an error induced by a high-pass filter in the measurement chain of a sensor.

2. Description of the Related Art

In the field of the measurement of physical quantities by means of a sensor, it is known for certain principles of measurement to deploy a high-pass filter required for obtaining the measurement. However this same high-pass filter causes an error by introducing disturbances. The only known remedy to this problem is currently to limit the impact of the high-pass filter on the useful signal, by reducing the cutoff frequency of the high-pass filter to the minimum, so as to move it away from the passband of the sensor.

BRIEF SUMMARY OF THE INVENTION

An aim of the invention is to theoretically estimate the error induced by the high-pass filter as a function of the characteristics of the high-pass filter and of the measurement signal output by the high-pass filter so as to correct this error in order to reconstruct the measurement signal.

The invention relates to a device for determining an error induced by a high-pass filter in a signal, comprising a means for calculating said error according to the formula:

$$E(t)=V_e(t)-V_s(t)=2 \cdot \Pi \cdot F_c \cdot \int_{\alpha=t_0}^{t}(V_s(\alpha)-\overline{V}_s(\alpha)) \cdot d\alpha + E(t_0)$$

with:
$E(t)$ the value of the error induced by the high-pass filter, as a function of the time variable t,
$\Pi$ the trigonometric constant,
$F_c$ the cutoff frequency of the high-pass filter,
$t_0$ the initial instant,
$\alpha$ integration variable,
$V_e$ the signal input to the high-pass filter,
$V_s$ the signal output by the high-pass filter,
$\overline{V}_s$ the mean value of the signal $V_s$.

According to a first embodiment of the invention said calculation means is periodically reset to zero.

The reset to zero can be controlled according to the invention by an external periodic signal.

Alternatively the reset to zero can be controlled according to the invention by a thresholding of the signal $V_s$.

Advantageously according to the invention said thresholding is carried out with a hysteresis.

According to another characteristic of the invention the threshold value used for the thresholding is substantially equal to the mean value $\overline{V}_s$ of the signal.

According to a second embodiment of the invention, the device further comprises a stabilizing filter.

According to another characteristic of the invention said stabilizing filter comprises a first-order low-pass filter, with transfer function $1/(1+\tau \cdot p)$, applied to the signal of mean value $\overline{V}_s$ and a first-order high-pass filter, with transfer function $\tau \cdot p/(1+\tau \cdot p)$, applied to the error signal E, with $\tau$ time constant of said filters and p Laplace variable.

According to yet another characteristic of the invention said low-pass filter employs the recurrence formula:

$$\overline{V}_s(i)=k \cdot \overline{V}_s(i-1)+(1-k) \cdot V_s(i)$$

and said high-pass filter employs the recurrence formula:

$$E(i) = k \cdot E(i-1) + \frac{[V_s(i) - \overline{V}_s(i)] + [V_s(i-1) - \overline{V}_s(i-1)]}{2 \cdot F_e}$$

with
k real number lying between 0 and 1, such that $k=\tau/(\tau+T_e)$,
$T_e$ sampling period,
i recurrence index, and
$F_e$ sampling frequency.

The invention also and more generally relates to a method of correcting an error induced by a high-pass filter in the measurement chain of a sensor, said method comprising in particular the following steps:
estimation of the error induced by the high-pass filter as a function of the characteristics of said high-pass filter by using a means for calculating said error of the type $$E(t)=V_e(t)-V_s(t)$$

correction of the error induced by the high-pass filter.

The invention further relates to the application of the device according to one of the above embodiments to the construction of a conditioner for a sensor comprising a high-pass filter, said conditioner furthermore comprising an adder device, adding said error E to the output signal of the sensor $V_s$, so as to produce a corrected signal $V_e$.

The invention further relates to a sensor comprising a high-pass filter, comprising such a conditioner.

The invention further relates to the application to a pressure sensor comprising a piezoelectric sensitive element.

BRIEF DESCRIPTION OF THE DRAWINGS

Other characteristics, details and advantages of the invention will emerge more clearly from the detailed description given hereinafter by way of indication in conjunction with the drawings in which.

DETAILED DESCRIPTION OF THE PREFERRED EMBODIMENTS

Figure 1:
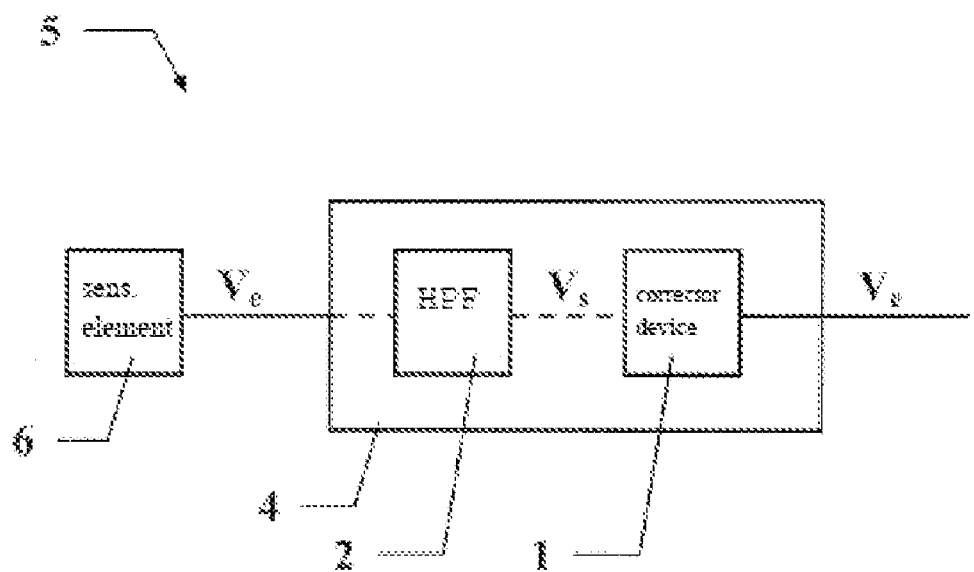
FIG. 1 presents a diagram of a sensor comprising a high-pass filter.

FIG. 1 illustrates the problem addressed by the invention. A sensor 5 measures a quantity Ve by means of a sensitive element 6 and produces a measurement signal $V_e$. This measurement signal $V_e$ is processed by a conditioner 4 comprising a high-pass filter 2, among other components that are not represented and depicted by the dotted line. This high-pass filter 2 may be required by the very principle of measurement and may not be removed. However this high-pass filter 2 disturbs the signal $V_e$ and produces a disturbed signal $V_s$. The aim of the invention is to produce a corrector device 1 capable of determining an error $E(t)=V_e(t)-V_s(t)$, so as to be able to reconstruct the original signal $V_e$ by addition.

Figure 2:
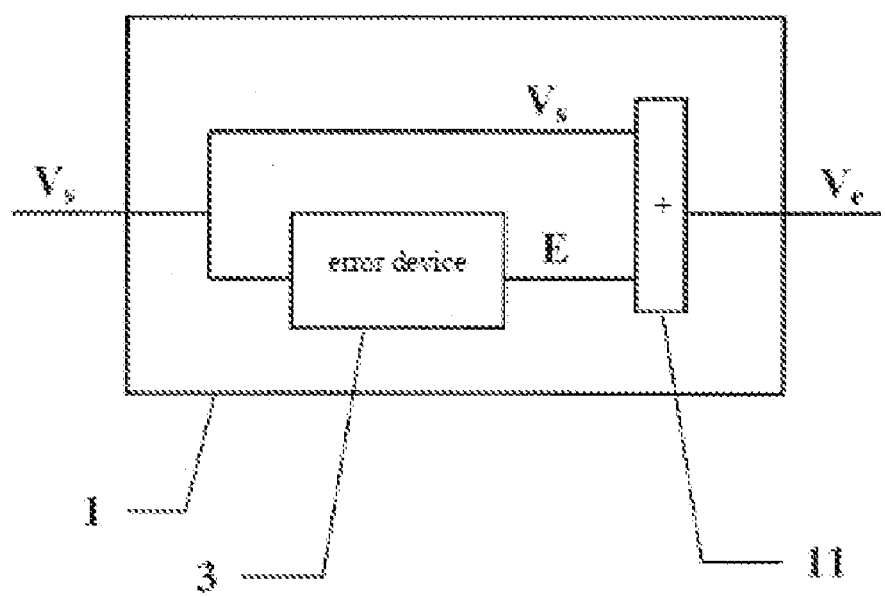
FIG. 2 illustrates a detail of a corrector device according to the invention.

FIG. 2 illustrates in detail said corrector device 1 which reconstructs an original signal $V_e$ by means of a device 3 for determining the error $E(t)=V_e(t)-V_s(t)$ and of a summator 11, on the basis of the disturbed signal $V_s$.

The subsequent description concentrates on the device 3 for determining the error E. The calculation principle relies on a theoretical analysis of the influence of a high-pass filter 2 on a signal. The transfer function of a first-order high-pass filter is:

$$\frac{s}{e}(p) = \frac{\tau \cdot p}{1 + \tau \cdot p}$$

with
s output signal,
e input signal,
p Laplace variable, and
$\tau$ time constant, with $2 \cdot \Pi \cdot F_c \cdot \tau = 1$, $F_c$ being the cutoff frequency of the high-pass filter 2.

The equivalent differential equation is:

$$\frac{ds}{dt} + 2 \cdot \Pi \cdot F_c \cdot s = \frac{de}{dt}$$

where t represents the time variable. By integration we deduce:

$$E(t) = [e-s](t) = 2 \cdot \Pi \cdot F_c \cdot \int_{\alpha=t_0}^{t} s(\alpha) \cdot d\alpha + [e-s](t_0)$$

It is important to note that this formula is usable only for a signal s of zero mean value. The real signal $V_s$ not necessarily meeting this condition, this is corrected by using a signal $V_s$ corrected by its mean value $\overline{V}_s$. In the case considered the formula becomes:

$$E(t) = V_e(t) - V_s(t) = 2 \cdot \Pi \cdot F_c \cdot \int_{\alpha=t_0}^{t} (V_s(\alpha) - \overline{V}_s(\alpha)) \cdot d\alpha + E(t_0)$$

Figure 3:
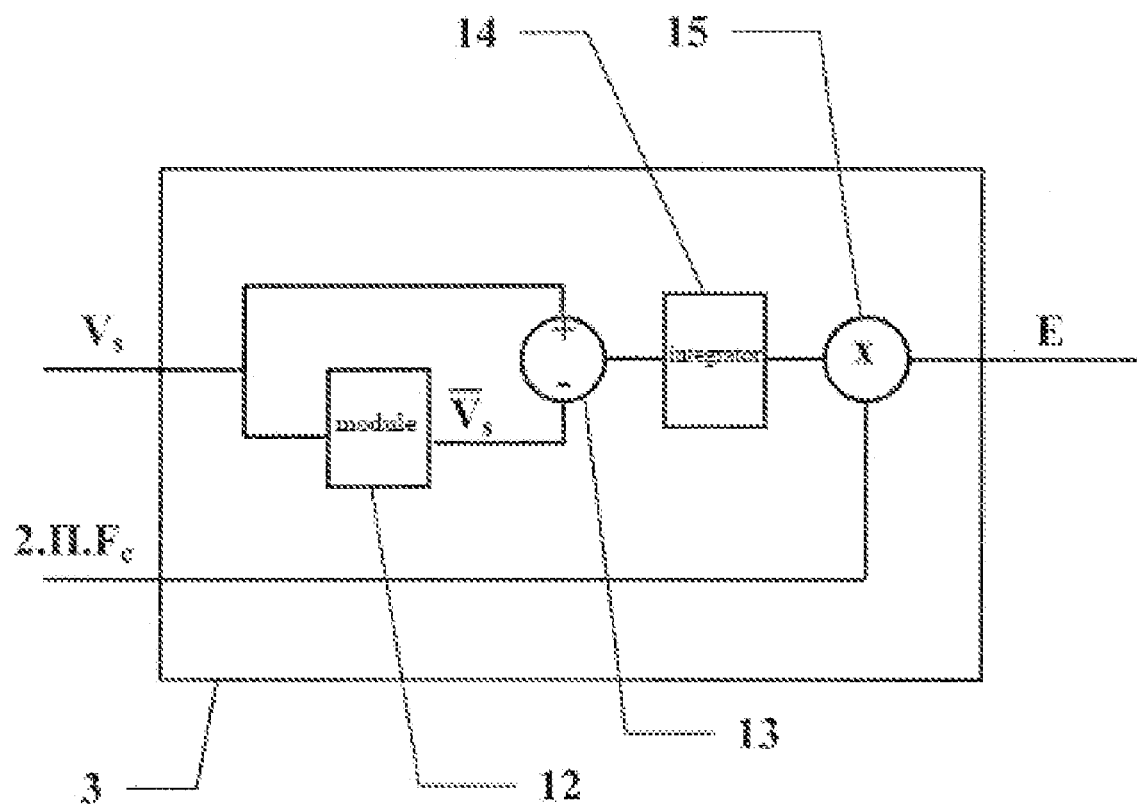
FIG. 3 illustrates a device for determining according to the invention the error induced by a high-pass filter.

By knowing the value of the error $E(t_0)$ at a given instant $t_0$, it is possible to determine the error E(t) at any instant, by integrating the signal $V_S$ minus its mean value $\overline{V}_s$. At least one initial instant is known where the error is zero. FIG. 3 thus illustrates the device for determining the error 3. This device 3 comprises a module 12 for determining the mean value $\overline{V}_s$ of the signal $V_s$, a summator 13 which subtracts this mean value from the signal $V_s$, an integrator 14 which determines the integral of this zero mean signal $V_S - \overline{V}_s$ and a scalar multiplier 15 which multiplies by $2 \cdot \Pi \cdot F_c$ to obtain an estimation of the error E. The cutoff frequency $F_c$ is determined as a function of the characteristics of the high-pass filter 2. Thus, in the case of a high-pass filter 2 conventionally embodied as an RC dipole, $F_c = 1/(2 \cdot \Pi \cdot R \cdot C)$. An accurate determination of the cutoff frequency contributes to the accuracy of the device 3.

The device 3 which is the subject of the invention and its various components can be embodied by any means known to a person skilled in the art of analog or digital type. However, whatever technology is employed, the presence of an integrator 14 leads to a drift. Thus, for example, when the device 3 is embodied using digital technology, errors related to the sampling and to the trapezoidal approximation used for the integration contribute to this drift.

If it is assumed that the measured signal $V_e$, and therefore the disturbed signal $V_s$, is periodic, it then follows that the error E arising from an integration of said signal $V_s$ vanishes periodically according to a period identical to that of the signals $V_e$, $V_s$. This is exploited according to two embodiments of the invention, so as to reduce the impact of this drift. This drift is considered acceptable during a period of the signal since it is negligible in relation to the error E determined. According to a first embodiment of the invention, the error E is periodically reset to zero. According to a second embodiment, an additional filtering is applied to the error E.

According to the first embodiment the calculation means 3 comprises a means for resetting the error E(t) to zero. According to a first variant the means for resetting to zero is controlled by a periodic signal external to the device.

However, it is possible that this external periodic signal may not be available. According to a second variant, the periodic signal $V_s$ may advantageously be threshold so as to control the resetting to zero. A thresholding means (not represented) then compares the signal $V_s$ with a threshold value S. Said signal $V_s$ being periodic, such a thresholding must reveal, for a well-chosen threshold S, over each period, a crossing of the threshold S "upward" and a crossing of the threshold S "downward". The reset to zero can then advantageously be performed, controlled by one of these crossings.

In order to circumvent a local oscillation of the threshold signal, it is advantageous to carry out the thresholding with a certain hysteresis, according to a procedure well known to a person skilled in the art, by using a greater hysteresis width than the foreseeable amplitude of said oscillation.

Advantageously, to perform a reset to zero of the error E close to the point where it vanishes naturally, the reset to zero is performed when the signal $V_s$ exhibits a point of inflection. For this purpose the threshold value S used for the thresholding is taken to be equal to the mean value $\overline{V}_s$ of the signal.

According to the second embodiment, alternatively to a reset to zero, the device according to the invention 3 comprises a stabilizing filter. Such a device is advantageous in that it does not cause any signal discontinuity such as that possibly induced by the reset to zero used in the first embodiment. Thus this second embodiment, since it does not carry out any thresholding, is advantageously more robust to the oscillations of the signal $V_S$ and to parasitic noise.

The stabilizing filter advantageously comprises a first-order low-pass filter 9, with transfer function $1/(1 + \tau \cdot p)$, applied to the signal of mean value $\overline{V}_s$ and a first-order high-pass filter 10, with transfer function $\tau \cdot p/(1 + \tau \cdot p)$, applied to the error signal E, $\tau$ denoting an identical time constant for these two filters and p the Laplace variable. A time constant of the order of $\tau = 0.2$ s turns out to be satisfactory.

Figure 4:
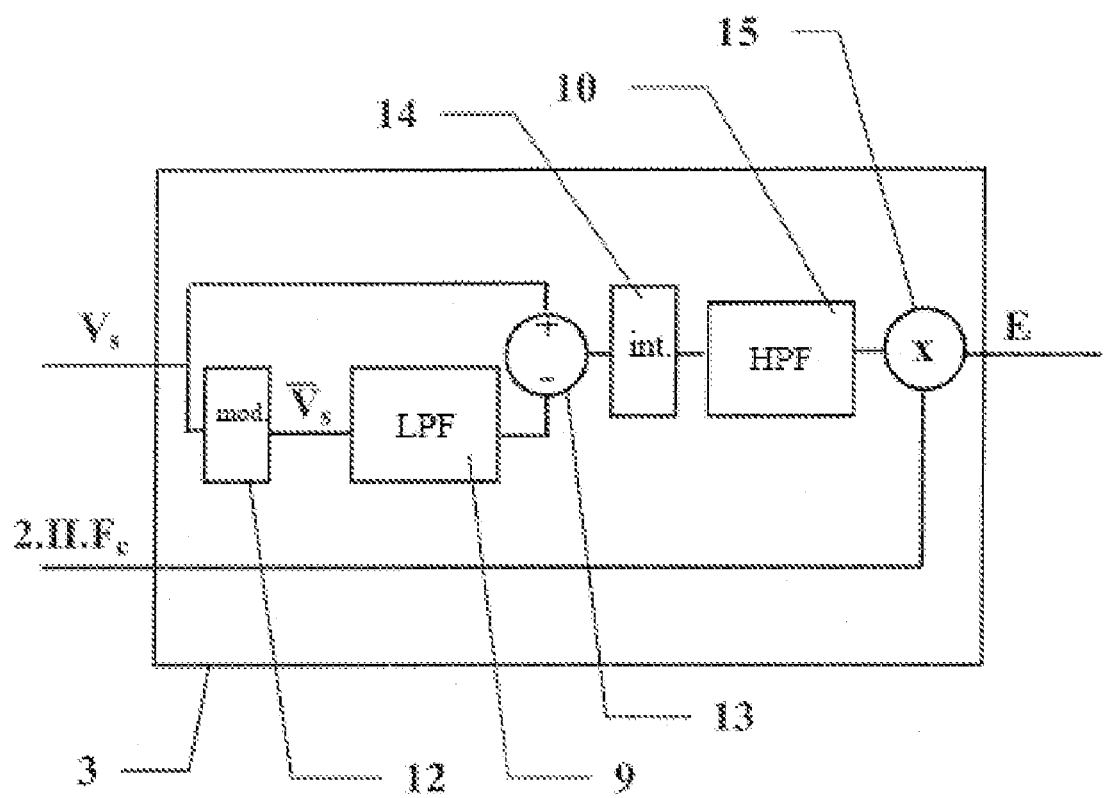
FIG. 4 illustrates a second embodiment of such a determining device according to the invention.

FIG. 4 illustrates a device 3 for determining the error E comprising, in addition to the components described with reference to FIG. 3, a low-pass filter 9 such as this and a high-pass filter 10 such as this. It may be noted that the filter 10 may equally well be applied to E by being deployed downstream of the multiplier 15 or to the quantity $\int_{\alpha=t_0}^{t}(V_s(\alpha) - \overline{V}_s(\alpha)) \cdot d\alpha$ by being deployed upstream of the multiplier 15.

According to a method well known to a person skilled in the art, the embodying of filters with digital calculation means replaces the transfer functions with recurrence formulae applicable to the signals sampled according to a period Te and indexed as a function of an index i. Thus the disturbed measurement signal $V_s$ is denoted $V_s(t)$ at the instant t in continuous mode. In an equivalent manner $V_s(i)$, respectively $V_s(i-1)$, denotes the sampled value of the signal $V_s$ respectively for the $i^{th}$ and for the $i-1^{th}$ sampling. The recurrence formulae are respectively for the low-pass filter 9: $\overline{V}_s(i) = k \cdot \overline{V}_s(i-1) + (1-k) \cdot V_s(i)$ and for the high-pass filter 10:

$$E(i) = k \cdot E(i-1) + \frac{[V_s(i) - \overline{V}_s(i)] + [V_s(i-1) - \overline{V}_s(i-1)]}{2 \cdot F_e},$$

with k real number lying between 0 and 1, and such that $k=\tau/(\tau+T_e)$, $T_e$, $F_e$ respectively sampling period and frequency, and i recurrence index.

A value of k=0.9999 turns out to be satisfactory. It corresponds to a value of the time constant τ=0.2, for a sampling period of 200 ms. Increasing the value of k makes it possible to improve the accuracy of the device 3. However this is performed to the detriment of its speed, an increase in k being equivalent to an increase in the response time τ. Likewise it is possible to decrease k, so as to increase the speed to the detriment of the accuracy.

Referring to FIGS. 1 and 2, the invention further relates to a conditioner 4 for a sensor 5 comprising a high-pass filter 2, comprising a device 3 according to one of the embodiments described above determining the error E induced by the high-pass filter in a measurement signal and a summator device 11, adding said error E to the output signal of the sensor $V_s$, so as to produce a corrected signal $V_e$ thus correcting the disturbance induced by the high-pass filter 2.

The present invention can certainly be generalized to filters of order higher than one by applying the principles stated above. The invention therefore also relates to a method of correcting an error induced by a high-pass filter in the measurement chain of a sensor, said method comprising in particular the following steps:

the estimation of the error induced by the high-pass filter as a function of the characteristics of said high-pass filter. This estimation is done by using a means for calculating said error of the type $E(t)=V_e(t)-V_s(t)$ the correction of the error induced by the high-pass filter.

By way of exemplary application of the invention there may be cited a pressure sensor 5 whose sensitive element 6 comprises a piezoelectric dielectric capacitor. According to a known measurement principle, said capacitor reveals at its terminals a charge representative of the pressure to which it is subjected. A voltage signal indicative of the pressure is obtained by integrating said charge by means of an operational amplifier. Realization of the circuit for amplifying the charge necessarily introduces a high-pass filter. The invention is applicable to such a pressure sensor so as to compensate for the disturbance introduced by said high-pass filter.

One case of application of said pressure sensor is the measurement of the pressure in an internal combustion engine cylinder. Such a measurement reveals a periodic signal whose period corresponds to an engine cycle. The external reset to zero signal may in this case arise from the measurement of the crankshaft angle.

What is claimed is:

1. A device for determining an error induced by a first-order high-pass filter in a signal, the device comprising:
    a processing device; and
    a means for calculating said error according to the formula:

$E(t)=V_e(t)-V_s(t)=2\cdot\Pi\cdot F_c\cdot\int_{\alpha=t_0}^{t}(V_s(\alpha)-\overline{V}_s(\alpha))\cdot d\alpha+E(t_0)$ with:
    E(t) the value of the error induced by the high-pass filter, as a function of the time variable t,
    Π the trigonometric constant,
    $F_c$ the cutoff frequency of the high-pass filter,
    $t_0$ the initial instant,
    α an integration variable,
    $V_e$ the signal input to the high-pass filter,
    $V_s$ the signal output by the high-pass filter,
    $\overline{V}_s$ the mean value of the signal $V_s$,
    wherein the processing device is configured to cause the means for calculating the error to calculate the error according to the formula.

2. The device according to claim 1, further comprising a stabilizing filter.

3. The device according to claim 2, wherein said stabilizing filter comprises a first-order low-pass filter, with transfer function $1/(1+\tau\cdot p)$, applied to the signal of mean value $\overline{V}_s$ and a first-order high-pass filter, with transfer function $\tau\cdot p/(1+\tau\cdot p)$, applied to the error signal E, with τ time constant of said filters and p Laplace variable.

4. The device according to claim 3, wherein said low-pass filter employs the recurrence formula:

$\overline{V}_s(i)=k\cdot\overline{V}_s(i-1)+(1-k)\cdot V_s(i)$ and said high-pass filter employs the recurrence formula:

$$E(i) = k \cdot E(i-1) + \frac{[V_s(i) - \overline{V}_s(i)] + [V_s(i-1) - \overline{V}_s(i-1)]}{2 \cdot F_e}$$

with k real number lying between 0 and 1, such that $$k = \frac{\tau}{\tau + T_e},$$

$T_e$, $F_e$ respectively sampling period and frequency, and
i recurrence index.

5. The device according to claim 1, wherein said calculation means comprises a means for resetting the error to zero.

6. The device according to claim 5, wherein the means for resetting to zero is controlled by an external periodic signal.

7. The device according to claim 5, wherein the means for resetting to zero is controlled by a thresholding of the signal $V_s$.

8. The device according to claim 7, wherein the threshold value used for the thresholding is equal to the mean value $\overline{V}_s$ of the signal.

9. The device according to claim 7, wherein said thresholding is carried out with a hysteresis.

10. The device according to claim 9, wherein the threshold value used for the thresholding is equal to the mean value $\overline{V}_s$ of the signal.

11. A conditioner for a sensor having a high-pass filter, the conditioner comprising:
    a device for determining an error induced by the high-pass filter in a measurement signal, the device comprising:
        a processing device, and
        a means for calculating said error according to the formula:

$E(t)=V_e(t)-V_s(t)=2\cdot\Pi\cdot F_c\cdot\int_{\alpha=t_0}^{t}(V_s(\alpha)-\overline{V}_s(\alpha))\cdot d\alpha+E(t_0)$ with:
        E(t) the value of the error induced by the high-pass filter, as a function of the time variable t,
        Π the trigonometric constant,
        $F_c$ the cutoff frequency of the high-pass filter,
        $t_0$ the initial instant,
        α an integration variable,
        $V_e$ the signal input to the high-pass filter,
        $V_s$ the signal output by the high-pass filter,
        $\overline{V}_s$ the mean value of the signal $V_s$,
        the processing device being configured to cause the means for calculating the error to calculate the error according to the formula; and
    a summator device, adding said error to the output signal $V_s$ of the sensor, so as to produce a corrected signal $V_e$.

12. A sensor, comprising:

a high-pass filter; and a conditioner comprising a device for determining an error induced by the high-pass filter in a measurement signal, the device comprising:

a processing device, and a means for calculating said error according to the formula:

$$E(t)=V_e(t)-V_s(t)=2\cdot\Pi\cdot F_c\cdot\int_{\alpha=t_0}^{t}(V_s(\alpha)-\overline{V}_s(\alpha))\cdot d\alpha+E(t_0)$$

with:

E(t) the value of the error induced by the high-pass filter, as a function of the time variable t, $\Pi$ the trigonometric constant, $F_c$ the cutoff frequency of the high-pass filter, $t_0$ the initial instant, $\alpha$ an integration variable, $V_e$ the signal input to the high-pass filter, $V_s$ the signal output by the high-pass filter, $\overline{V}_s$ the mean value of the signal $V_s$, the processing device being configured to cause the means for calculating the error to calculate the error according to the formula; and a summator device, adding said error to the output signal $V_s$ of the sensor, so as to produce a corrected signal $V_e$.

13. A method of measuring the pressure in an internal combustion engine cylinder, the method comprising:

measuring the pressure by a pressure sensor, using a piezoelectric sensitive element fitted to the sensor, the sensor comprising a high-pass filter; and a conditioner comprising a device for determining an error induced by the high-pass filter in a measurement signal, the device comprising:

a processing device, and a means for calculating said error according to the formula:

$$E(t)=V_e(t)-V_s(t)=2\cdot\Pi\cdot F_c\cdot\int_{\alpha=t_0}^{t}(V_s(\alpha)-\overline{V}_s(\alpha))\cdot d\alpha+E(t_0)$$

with:

E(t) the value of the error induced by the high-pass filter, as a function of the time variable t, $\Pi$ the trigonometric constant, $F_c$ the cutoff frequency of the high-pass filter, $t_0$ the initial instant, $\alpha$ an integration variable, $V_e$ the signal input to the high-pass filter, $V_s$ the signal output by the high-pass filter, $\overline{V}_s$ the mean value of the signal $V_s$, the processing device being configured to cause the means for calculating the error to calculate the error according to the formula; and a summator device, adding said error to the output signal $V_s$ of the sensor, so as to produce a corrected signal $V_e$.

14. A method of correcting an error induced by a high-pass filter in the measurement chain of a sensor, said method comprising:

estimating the error induced by the high-pass filter as a function of the characteristics of said high-pass filter by using a means for calculating said error of the type $$E(t)=V_e(t)-V_s(t), \text{ with}$$

E(t) being the value of the error induced by the first-order high-pass filter, as a function of the time variable t, $V_e(t)$ being the signal input to the high-pass filter as a function of the time variable t, and $V_s(t)$ being the signal output by the high-pass filter as a function of the time variable t; and correction of the error induced by the high-pass filter, wherein a processing device is configured to cause the means for calculating the error to calculate the error.

15. The method of correcting an error induced by a first-order high-pass filter according to claim 14, wherein the means for calculating said error is of the type:

$$E(t)=V_e(t)-V_s(t)=2\cdot\Pi\cdot F_c\cdot\int_{\alpha=t_0}^{t}(V_s(\alpha)-\overline{V}_s(\alpha))\cdot d\alpha+E(t_0)$$

with:

$\Pi$ the trigonometric constant, $F_c$ the cutoff frequency of the high-pass filter, $t_0$ the initial instant, $\alpha$ an integration variable, and $\overline{V}_s$ the mean value of the signal $V_s$.

* * * * *

UNITED STATES PATENT AND TRADEMARK OFFICE
CERTIFICATE OF CORRECTION

PATENT NO.       : 8,412,478 B2  
APPLICATION NO. : 12/446360  
DATED            : April 2, 2013  
INVENTOR(S)      : Ramond et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1018 days.

Signed and Sealed this

First Day of September, 2015

Michelle K. Lee  
*Director of the United States Patent and Trademark Office*